United States Patent

[11] 3,581,061

| [72] | Inventor | William W. Chambers |
| | | Anaheim, Calif. |
| [21] | Appl. No. | 757,695 |
| [22] | Filed | Sept. 5, 1968 |
| [45] | Patented | May 25, 1971 |
| [73] | Assignee | Robertshaw Controls Company |
| | | Richmond, Va. |

[54] TEMPERATURE CONTROL SYSTEM PROVIDING FULL-WAVE CONDUCTION INTO TEMPERATURE CHANGE APPARATUS
7 Claims, 2 Drawing Figs.

| [52] | U.S. Cl. | 219/499 |
| [51] | Int. Cl. | H05b 1/02 |
| [50] | Field of Search | 219/499, 501, 477, 483, 494 |

[56] References Cited
UNITED STATES PATENTS
3,149,224  9/1964  Horne et al. ............... 219/499X
3,161,759  12/1964  Gambill et al. ............ 219/494
3,211,214  10/1965  Chambers ................. 219/499

*Primary Examiner*—Bernard A. Gilheany
*Assistant Examiner*—F. E. Bell
*Attorney*—Fulwider, Patton, Rieber, Lee & Utecht ABSTRACT: A temperature control system for connection in series with an alternating current source and an environmental change apparatus, the system including a temperature-sensitive bridge circuit which becomes unbalanced in response to environmental temperature change, the unbalance triggering a controlled rectifier which applies power from the source to the environmental change apparatus, a full-wave bridge rectifier of the system applying positive anode voltage to the controlled rectifier during both negative and positive polarity half-cycles of the source voltage.

PATENTED MAY 25 1971
3,581,061
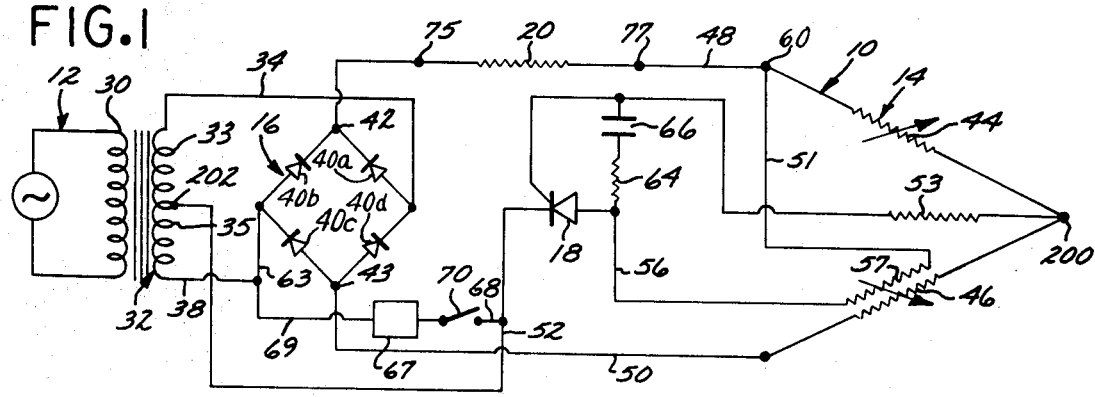
FIG.1
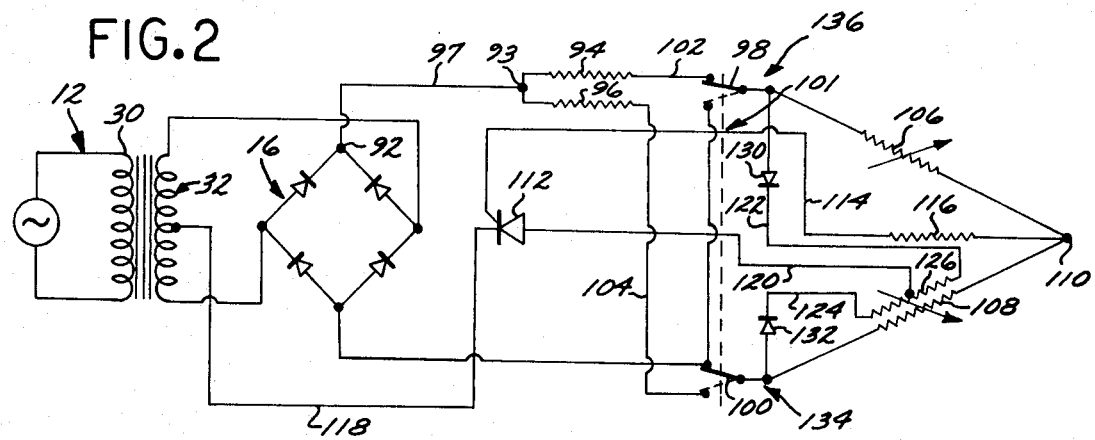
FIG.2
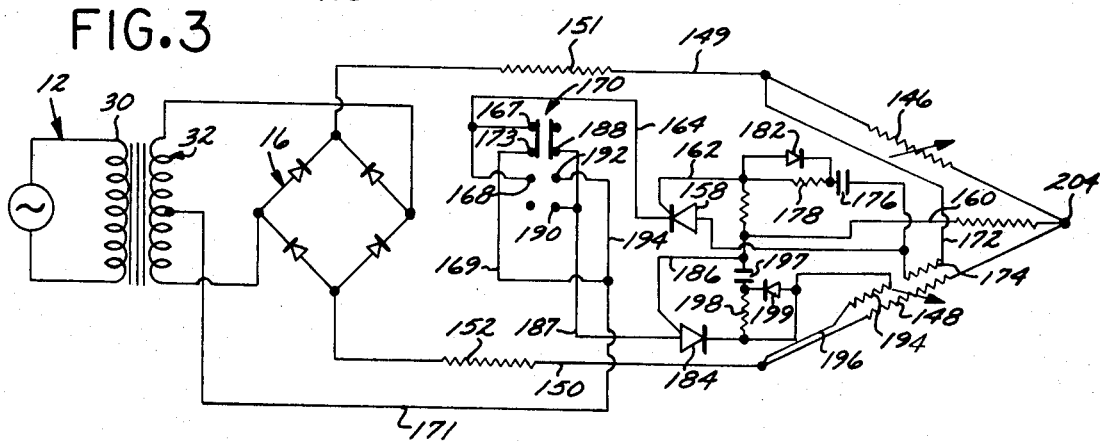
FIG.3
FIG.4
INVENTOR.
WILLIAM W. CHAMBERS
BY Fulwider, Patton, Rieber,
Lee and Utecht
ATTORNEYS

TEMPERATURE CONTROL SYSTEM PROVIDING FULL-WAVE CONDUCTION INTO TEMPERATURE CHANGE APPARATUS

CROSS-REFERENCES TO RELATED APPLICATION

The present invention is related to the subject matter disclosed in my copending U.S. Pat. application, Ser. No. 637,490, filed May 10, 1967, and entitled "TEMPERATURE CONTROL SYSTEM" and which is directed to a temperature control arrangement which also employs a controlled rectifier to regulate the operation of an environmental temperature change apparatus. However, in that temperature control system the controlled rectifier was so operated that it was incapable of full-wave conduction into the temperature change apparatus. Consequently, the control system could not be used to directly operate loads requiring comparatively high power levels, and particularly multiple loads requiring simultaneous energization, such as electric heaters and their fans or loads which are subject to hum caused by application of chopped half-wave rectified power.

BACKGROUND OF THE INVENTION

1. Field of the Invention

The present invention relates to a temperature control system of the type that can be adjusted to select a desired environmental temperature, and which is responsive to a differential between the selected temperature and the actual environmental temperature to actuate a furnace, cooler, air-conditioning unit, or other temperature change apparatus, and continue to actuate such apparatus until the selected environmental temperature is reached.

2. Description of Prior Art

The operation of the usual temperature control system is regulated by a sensor which monitors the temperature in the environment to be controlled by the temperature change apparatus. When the temperature changes from a predetermined, desired level, the sensor actuates the temperature control circuit to effect operation of the temperature change apparatus. After the temperature change apparatus has brought the environmental temperature back to the desired or selected level, the sensor responds by effecting deactuation of the temperature change apparatus.

Recent temperature control systems, as exemplified by the systems disclosed in my above-identified patent application, Ser. No. 637,490, utilized so-called "solid-state" sensors and switches in place of the prior-art bimetallic strip switches which are characterized by physical movement in response to temperature change to mechanically make and break electrical circuit connections. Solid-state components such as thermistor sensors and controlled rectifier and transistor switches respond much more rapidly and accurately to temperature changes, and have a comparatively long and trouble-free service life. However, solid-state temperature control systems of the prior art which utilize the triggering of a controlled rectifier to provide current to the heating load, cooling load, or combination of the two, suffer certain limitations. More particularly, such a controlled rectifier of these systems is associated with an alternating current bridge circuit which is sensitive to variations from the preset or selected environmental temperature to apply a portion of the source voltage to the rectifier gate for triggering. The triggered rectifier is then operative to provide conduction into the load constituting the environmental temperature change apparatus. In these prior-art systems the positive polarity half-cycles of the source voltage were utilized, for example, to operate the heating load, while the negative polarity half-cycles of the voltage source were utilized to operate the cooling load. Consequently, whichever load was in operation, the power was developed at the load only during alternate half-cycles of the source voltage and, depending upon the rectifier conduction angle, for only a portion of the particular half-cycle. Consequently, it was not possible to operate certain types of loads, such as solenoid devices which are subject to hum or high-power devices in which the current through the controlled rectifier will heat the gate junction enough to change its characteristics.

SUMMARY OF THE INVENTION

The present invention relates to a temperature control system of the normally balanced bridge type which becomes unbalanced in response to departure of the actual environmental temperature from a desired environmental temperature selected by adjustment of a temperature selection means in the bridge circuit. The present temperature control system includes a controlled rectifier which is triggered by unbalance of the bridge, and full-wave rectifier means are interposed between the alternating current supply and the bridge circuit and rectifier so that full-wave conduction into the temperature change apparatus load is achieved. That is, the controlled rectifier is triggered on each of the positive and negative polarity half-cycles of source voltage. In addition, a pulse-shaping network is also employable to increase the conduction angle of the rectifier to thereby provide increased power at the load. Despite the utilization of full-wave conduction into the temperature change apparatus, the present control system is nevertheless adapted to operate either a heating or a cooling load, as circumstances require.

The present temperature control system is also adapted to incorporate many of the refinements or sophistications of existing solid-state circuits, such as manual changeover between heating and cooling functions; automatic changeover between such functions; and feedback heating of the temperature-sensitive portion of the bridge circuit to shorten the duration of operation of the temperature change apparatus and thereby avoid "overshoot."

The foregoing as well as other objects and features of the present invention may be more clearly understood by reference to the following detailed description, when considered with the drawings which illustrate particular temperature control systems according to the present invention.

BRIEF DESCRIPTION OF THE DRAWING

FIG. 1 is a wiring diagram of a form of temperature control system according to the present invention, the system providing a heating only or a cooling only function;

FIG. 2 is a wiring diagram of a second stage control system which may be used with a control system of the type shown in FIG. 1;

FIG. 3 is a wiring diagram of the system of FIG. 1 modified to provide both heating and cooling functions with manual changeover; and FIG. 4 is a wiring diagram of the system of FIG. 1 modified to provide both heating and cooling functions with automatic changeover.

DESCRIPTION OF THE PREFERRED EMBODIMENTS

Referring now to the drawings, and particularly to FIG. 1, there is illustrated a temperature control system 10 according to the present invention which comprises, generally: an AC power source 12 coupled with a temperature-sensitive bridge 14 through a full-wave bridge rectifier 16. Unbalancing the bridge 14 triggers a silicon controlled rectifier (SCR) 18 which controls current through a heat motor 20 (FIG. 4) disposed in heat exchange relationship with a temperature-sensitive switch 22 controlling power to a heater 24. Thus, when the bridge 14 is unbalanced by environmental cooling below the desired temperature, positive triggering pulses will be imposed on the SCR 18 thereby providing continuous pulsating current flow through the heat motor 20 to affect rapid heating to quickly close the bimetallic switch 22.

The AC source 12 includes a transformer having a primary coil 30 and a center-tapped secondary coil, generally designated 32, which forms two legs 33 and 35 and is connected on its opposite ends to the full-wave rectifier bridge 16 by leads 34 and 36. The rectifier bridge 16 is of conventional design and includes four rectifiers, 40a, 40b, 40c and 40d.

Two legs of the bridge 14 are formed by the halves of the secondary coil 32 and the other two legs are formed by a temperature-sensitive potentiometer 44 connected in series with a negative temperature coefficient thermistor 46. The potentiometer 44 and thermistor 46 are connected across the positive and negative terminals 42 and 43 of the rectifier bridge 16 by means of leads 48 and 50, respectively, the lead 48 including the aforementioned heat motor 20.

The gate and cathode of the SCR 18 are connected across the temperature-sensitive bridge 14 by leads 51 and 52, the lead 51 including a current-limiting resistor 53. The anode of the controlled rectifier 18 is connected with the positive terminal 60 of the potentiometer 44 by a lead 56 including a heating resistor 57 disposed in heat exchange relationship with the thermistor 46. A resistor 64 and capacitor 66 are connected in series across the gate lead 51 and the anode lead 56 to shape the triggering pulse to provide current flow in the power circuit throughout substantially the entire power circuit current pulse. A furnace fan 67 has its motor connected between the cathode lead 52 and one end of the secondary coil 32 by leads 68 and 69, the lead 68 including a control switch 70.

For certain applications, it is desirable to have the capability of actuating a first stage heater when relatively small amounts of heat are called for and a second stage heater when larger amounts of heat are called for. The control system shown in FIG. 1, with the pulse-reshaping resistor 64 and capacitor 66 removed, is particularly effective as a first stage control system and the system, generally designated 72 (FIG. 4) may serve as a second stage control system. Referring to FIG. 4, the secondary control system 72 may be connected across the first stage heat motor 20 by a pair of leads 73 and 74 connected to terminals 75 and 77. The second stage control system 72 includes a heat motor 76 through which current flow is controlled by an SCR 78. Voltage divider resistors 80 and 82 are connected in series between the leads 73 and 74 and a capacitor 84 and resistor 86 are connected in the cathode-gate circuit of the SCR 78 to affect phase shift between the gate and cathode. This second stage control 72 is more fully described in my copending U.S. Pat. application entitled "Temperature Control System" filed Aug. 4, 1966 and bearing the Ser. No. 637,490.

The temperature control system shown in FIG. 4 is intended to provide for manual selection between environmental heating and environmental cooling, such system including a power source 12 having a transformer formed by primary and secondary coils 30 and 32. The opposite ends of the secondary coil 32 are connected across the input terminals of a full-wave rectifier bridge 16 and the positive output terminal 92 of such bridge is connected to a common terminal 93 between a heating motor 94 and a cooling motor 96 by means of a lead 97. The heating and cooling motors 94 and 96, respectively, are comparable to the heating motor 20 shown in FIG. 1, each being connected with a respective switch 98 and 100 of a ganged switch 101 by leads 102 and 104, respectively.

Connected in series between the movable terminals of the switches 98 and 100 are a temperature selector potentiometer 106 and thermistor 108, the juncture 110 between such potentiometer and thermistor being connected with the gate of a silicon controlled rectifier 112 by means of a lead 114 having a current-limiting resistor 116 therein. The cathode of the rectifier 112 is connected to the center tap of the secondary transformer coil 32 by a lead 118. The anode of the rectifier 112 is connected to the movable contacts of the switches 98 and 100 by means of the leads 120, 122 and 124, the lead 120 being connected centrally to a heating resistor 126 disposed in heat exchange relationship with the thermistor 108. The leads 122 and 124 include diodes 130 and 132, respectively, for blocking current flow between terminals 134 and 136.

The heat control system shown in FIG. 4 provides the option of manually selecting heat control or cooling control and also provides a third alternative affecting automatic selection between heat control and cooling control. The system shown in FIG. 4 includes an AC power source, generally designated 12, having a transformer formed by a primary coil 30 and a center-tapped secondary coil 32. The opposite ends of the secondary coil 32 are connected to the input terminals of a full-wave rectifier bridge 16. The output terminals of the bridge 16 are connected across a series of connected potentiometer 146 and thermistor 148 by leads 149 and 150, the leads 149 and 150 including heat and cooling loads 151 and 152, respectively.

The gate and cathode of a cathode-triggered rectifier 158 are connected across the temperature-sensitive bridge by means of leads 160, 162 and 164, the lead 164 being connected in parallel with contacts 167 and 168 of a switch 170. Leads 169 and 171 connect a contact 173 disposed intermediate the contacts 167 and 168 with the center tap of the coil 32. The anode of the rectifier 158 is connected with the positive terminal of the potentiometer 146 by means of a lead 172 including a heating resistor 174 disposed adjacent the thermistor 148. Connected between the anode lead 172 and the gate lead 162 is a capacitor 176 connected in series with a resistor 178 which is connected in parallel with a diode 182 whereby such capacitor will be charged at one rate and discharged at a second rate to reshape the signal, or gating, current to effect triggering of the power current early in the power current pulse.

An anode-controlled rectifier 184 has its gate and anode connected across the temperature-sensitive bridge by means of leads 186 and 187, the lead 187 being connected in parallel with a pair of contacts 188 and 190 of the switch 170. A contact 192 disposed between the contacts 188 and 190 is connected to the center tap lead 171 by means of a lead 194. The cathode of the rectifier 158 is connected with the negative terminal of the thermistor 148 by a lead 196 including a heat feedback resistor 194 disposed in heat exchange relationship with the thermistor 148. Connected in series between the gate lead 186 and cathode lead 196 is a capacitor 195 and a resistor 198, a diode 199 being connected in parallel with the resistor 198 to provide a path for capacitor discharge. Thus the capacitor is charged at one rate through the resistor 198 and discharged at a different rate through the diode 199 to effect desired pulse shaping.

In operation, power is supplied to the control system 10 (FIG. 1) and the selector potentiometer 44 set to provide a balanced condition at the desired temperature in the temperature-sensitive bridge comprised essentially of the potentiometer 44, thermistor 46, and the legs 33 and 35 of the center-tapped secondary transformer coil 32. When the top end of the secondary coil 32 is positive with respect to the bottom end, current will be conducted along the lead 34, through the diode 40a, and to the rectifier bridge output terminal 42. On the subsequent half-cycle, when the top half of the secondary coil 32 is negative with respect to the bottom end, conduction will take place through the leads 38, 63, and diode 40b to the outlet terminal 42 thereby rendering such terminal positive with respect to the rectifier bridge output terminal 43. Consequently, a positive pulsating full-wave DC current will be produced through the lead 48 from the rectifier output terminal 42 to the bridge terminal 60 and through the lead 56 and to the anode of the controlled SCR 18. For the purpose of this application, the term "DC current" comprehends pulsating DC current. It will be noted that the rectifier output terminal 42 will be positive with respect to the center tap 202 on every half-cycle thereby resulting in the anode of the controlled SCR 18 being positive with respect to the cathode on each successive half-cycle.

As long as the environmental temperature remains within the control range, the temperature-sensing bridge 14 will remain balanced thereby maintaining the nodes 200 and 202 at substantially the same potential to maintain the controlled SCR 18 untriggered. When the thermistor 46 cools to raise its resistance sufficiently to unbalance the bridge 14 to cause the node 200 to become sufficiently positive with respect to the node 202, a triggering signal will be imposed on the gate of the controlled SCR 18 to render it conductive and commence current flow through the heat motor 20.

It is noted that when the top end of the transformer secondary coil 32 is positive with respect to the bottom end, current conduction will take place through the diode 40a, rectifier bridge node 42, and lead 48 to the temperature-sensing bridge node 200 thereby rendering the SCR gate positive with respect to the cathode to thereby trigger such SCR. Thus, during this half-cycle, the resistance of the secondary coil half 33 is compared with the resistance of the potentiometer 44 and the resistance of the secondary coil half 35 is compared with the resistance of the thermistor 46. On the subsequent half-cycle, when the bottom half of the secondary coil 32 is positive with respect to the top end, current conduction takes place through the leads 38, 63, diode 40b, lead 48 and potentiometer 44 to render the temperature-sensing bridge node 200 positive thereby imposing a positive current on the gate of the controlled SCR 18. During this half-cycle, the resistance in the bottom half 35 of the secondary coil 32 is compared with the resistance of the potentiometer 44. During one half-cycle of current, the resistance in the top half 33 of the secondary coil 32 is compared with the resistance in the potentiometer 44 and on the subsequent half-cycle the resistance in the top coil half 33 is compared with the resistance in the thermistor 46 to thereby maintain pulsating direct current through the heat motor 20 as long as the temperature-sensing bridge 14 remains unbalanced.

The current flow through the heat motor 20 will cause the bimetallic switch 22 to heat rapidly and close thereby completing the circuit through the heater 24 and initiating environmental heating. When the environment becomes sufficiently warm to heat the thermistor 46 and increase its resistance to balance the bridge, thus lowering the voltage in the gate circuit of the rectifier 18 below the triggering value, the rectifier 18 will be rendered nonconductive thereby permitting the heat motor 20 to cool and enabling the heater switch 22 to open.

An advantageous feature of the control system 10 is the self-heating of the thermistor 46 to provide a lock-on characteristic. Such self-heating is caused by a small amount of current which passes through the thermistor 46 while the rectifier 18 is nonconductive thereby heating it slightly and reducing its resistance somewhat. Accordingly, the potentiometer 44 will be set to provide a correspondingly lower resistance to cause the bridge to balance at the desired temperature. When the rectifier 18 is triggered, the potential across the potentiometer 44 and thermistor 46 will be lowered somewhat thereby reducing the current flow through the thermistor 46 and enabling it to cool slightly, thus increasing its resistance to further unbalance the bridge 14 and securely lock the rectifier 18 in its triggered condition. This reduction in self-heating of the thermistor 46 will simulate a cooler than actual temperature of the environment and, without the heating resistor 57, the thermistor 46 would have to be heated above the target temperature to again balance the bridge and render the controlled rectifier 18 nonconductive to cause the heater switch 22 to open. However, when the rectifier 18 commences conduction, the heating resistor 57 will slowly heat the thermistor 46 sufficiently to compensate for the loss in self-heating thereby correctly simulating the environmental temperature and causing the control system to turn off at the target temperature. When the rectifier 18 is rendered nonconductive the resistor will cool to enable the thermistor 46 to likewise cool so it will lock on the next time the rectifier is triggered. Of course, resistance in the heating resistor 57 may be adjusted to provide any desired amounts of temperature overshoot or undershoot.

When the environmental temperature drops below some preselected level the second stage heating device 72 (FIG. 4) will be energized to provide additional heat for rapid heating of the environment. When such preselected temperature is reached, the resistance in the thermistor 46 will be high enough to provide sufficient unbalance in the bridge 14 to cause the current in the gate circuit of the rectifier 18 to reach the rectifier triggering level sufficiently early in the half-cycle of the power circuit to provide a sufficiently large conduction angle to cause the capacitor 84 of the second stage device 72 to charge to a certain level. When the capacitor 84 becomes charged to such certain level, triggering current will be provided at the gate of the rectifier 78 to render such rectifier conductive and energize the second stage heater 76 to accelerate environmental heating.

Operation of the temperature control system shown in FIG. 2 is somewhat similar to that for the system 10 shown in FIG. 1. When the ganged switches 98 and 100 are in their upper position shown in solid lines for controlling current in the heating load 94 and the thermistor 108 is cooled a predetermined amount below the desired environmental temperature, a triggering current will be provided through the electrode 114 to the gate of the controlled rectifier 112 to render such rectifier conductive. It will be noted that during such conduction, current from the heating load 94 and through the lead 122 is directed through the lead 120 to the anode of the rectifier 112, such current being blocked from passage through lead 124 by the blocking diode 132.

When the switches 98 and 100 are moved to their lower position, shown in broken lines, to direct positive current flow from the bridge rectifier 16 through switch 100, and the thermistor 108 heats sufficiently to decrease its resistance to a predetermined level resulting in the current passing from the positive terminals of the rectifier bridge 16, through the lead 104 and thermistor 108 driving the juncture 110 sufficiently positive with respect to the center tap of the coil 32 to exceed the triggering voltage, the rectifier will be triggered to heat the cooling load 96. The current flow through the rectifier 132 and lead 124 is directed to the anode of the rectifier 112 and is blocked from passing to the lead 122 by the rectifier 130. As above, when the thermistor 108 has been cooled sufficiently to provide sufficient resistance to enable the juncture 110 to be driven negative relative to the center tap of the secondary coil 32 and below the triggering voltage of the rectifier 112, the rectifier 112 is rendered nonconductive and the cooling load 96 may cool to enable the associated switch (not shown) to open.

When the control system shown in FIG. 3 is to be operated in its automatic mode, the switch 170 is switched to its central position completing the circuit between the contacts 173 and 168 and between 188 and 192. With the switch 170 so positioned, when the thermistor 148 cools a predetermined amount below the target temperature and increases its resistance sufficiently to unbalance the control bridge and cause a positive triggering current to be imposed on the gate of the cathode-triggered rectifier 158, such rectifier will be rendered conductive to pass current through the furnace heat motor 151, leads 149 and 172, rectifier 158, leads 164 and 206 to the center tap of the secondary coil 32 through lead 171. The rectifier 158 will remain conductive until the thermistor 148 is heated to reduce its resistance sufficiently to balance the temperature-sensitive bridge and lower the voltage in the cathode-gate circuit of the rectifier 158 below the triggering level, thereby deenergizing the furnace heat motor 140.

When the thermistor 148 is heated sufficiently by the environment to reduce its resistance and unbalance the bridge calling for cooling, the juncture 204 between the potentiometer 146 and thermistor 148 will be driven sufficiently negative to provide a triggering current through the lead 186 to the anode of the anode-triggered rectifier 184 thereby rendering it conductive. The rectifier 184 will thus pass current from the center tap of the secondary coil 32, through lead 171, through switch 170, lead 194, rectifier 184, lead 196, and through the cooling load 152 to the rectifier bridge 16. Again, when the thermistor 148 is cooled sufficiently to raise the potential at the juncture 204 sufficiently to decrease the current flow in the lead 186 below the triggering value of the anode-triggered rectifier 184, such rectifier will be rendered nonconductive thereby discontinuing current flow in the cooling load 152.

From the foregoing detailed description, it will be apparent that the temperature control system of present invention provides a convenient and economical means for controlling environmental temperatures. The system is nearly maintenance free and provides sufficient power in the heating and cooling loads to enable direct operation of DC solenoids and relays.

While particular forms of the temperature control circuit and systems have been described in some detail herein, changes and modifications may occur to those skilled in the art without departing from the spirit of the invention. It is therefore intended that the present invention be limited in scope only by the terms of the following claims.

I claim:

1. A temperature control system adapted for connection to a source of alternating current and comprising:

a bridge circuit;

temperature selection means in said bridge circuit and adjustable to provide an impedance value corresponding to a desired environmental temperature;

a temperature-sensitive means in said bridge circuit responsive to the actual environmental temperature to provide an impedance value affording a voltage balance across said bridge circuit upon substantial coincidence of said desired and said actual environmental temperature;

a controlled rectifier having its triggering circuit connected across said bridge circuit for triggering of said rectifier upon attainment of a voltage unbalance in said bridge circuit in excess of the rectifier-triggering voltage, said rectifier having its anode and cathode adapted for connection in series with said source and said temperature change apparatus;

full-wave bridge rectifier means for coupling to said source, and connected to said bridge circuit for applying pulsating direct current voltage to said rectifier during both the negative and positive polarity half-cycles of said source voltage;

an environmental temperature change apparatus including a heating load and a cooling load connected together on one end to form a juncture, said juncture being connected to one side of said bridge rectifier; and switching means for selectively connecting the other side of said bridge rectifier and one or the other of said heating and cooling loads across said bridge circuit whereby said rectifier is biased to a predetermined polarity for triggering during both said half-cycles.

2. A temperature control system for actuating an environmental change apparatus, said system comprising:

an alternating current conductor for connection with an AC source;

a gate-controlled conduction device having a power circuit that conducts in response to a triggering current of a selected polarity being imposed on the gate of said device;

lead means connecting one end of the power circuit of said controlled conduction device with the center of said AC conductor and the other end of said power circuit with the opposite ends of said AC conductor;

current-directing means connected with the opposite ends of said AC conductor for electrically coupling one end of said AC conductor with one side of said power circuit on one half-cycle of AC current to compare the resistance in one half of said conductor with the resistance in one leg of said temperature-sensing circuit and for electrically coupling the opposite end of said AC conductor with said one side of said power circuit during subsequent half-cycles to compare said resistance in said one leg with the resistance in the other half of said conductor; and a temperature-sensing circuit connected with said gate and said current-directing means and responsive to a predetermined temperature to produce a pulsating DC triggering current of said predetermined polarity whereby said AC conductor will apply pulsating DC to the power circuit of said conduction device and will apply pulsating DC to said gate to trigger said conduction device and render it conductive on each half-cycle.

3. The improved temperature control system of claim 1 that includes:

a first unidirectional current-directing element connected in series between said heating load and said controlled rectifier and a second unidirectional current-directing element connected in series between said cooling load and said controlled rectifier, to block current flow from the load selected by said switching to said other side of said bridge rectifier thereby directing said current flow through said controlled rectifier.

4. The improved temperature control system of claim 2 wherein:

said current-directing means comprises a full-wave bridge rectifier;

said environmental temperature change apparatus includes a heating load and a cooling load connected together on their one ends to form a juncture and said juncture is connected to one side of said rectifier bridge; and said temperature control system includes switching means for selectively connecting the other side of said bridge rectifier with one or the other of said heating and cooling loads across said bridge circuit.

5. The improved temperature control system of claim 4 that includes:

a first unidirectional current-directing element connected in series between said heating load and said controlled conduction device and a second unidirectional current-directing element connected in series between said cooling load and said conduction device to block current flow from the load selected by said switching means to said other side of said bridge rectifier thereby directing current flow through said conduction device.

6. The temperature control system of claim 2 wherein:

said current-directing means includes a full-wave bridge rectifier;

said environmental change apparatus includes a heating load connected to one side of said bridge and a cooling load connected to the other side of said bridge;

said conduction device is in the form of a cathode-triggered rectifier; and said system includes an anode-triggered rectifier having its gate connected in parallel with the gate of said cathode-controlled rectifier and its cathode connected to the side of said bridge circuit opposite the side to which the anode of said controlled rectifier is connected, said anode-triggered rectifier having its anode and cathode adapted for connection in series with said source and said temperature change apparatus.

7. The temperature control system of claim 1 wherein:

said controlled rectifier is cathode triggered and has its gate connected with one side of said bridge;

said system includes an anode-triggered rectifier having its gate connected in parallel with the gate of said cathode-triggered rectifier and its cathode connected to the side of said bridge circuit opposite said one side, said anode-triggered rectifier having its anode and cathode adapted for connection in series with said source and said temperature change apparatus.